(12) United States Patent
Ikeda et al.

(10) Patent No.: US 7,017,226 B2
(45) Date of Patent: Mar. 28, 2006

(54) DUST REMOVAL APPARATUS

(75) Inventors: Hideki Ikeda, Sayama (JP); Hideaki Tsukahara, Sayama (JP); Shinji Miyajima, Sayama (JP); Seiichi Honda, Sayama (JP); Eiji Inomata, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 346 days.

(21) Appl. No.: 10/346,894

(22) Filed: Jan. 17, 2003

(65) Prior Publication Data

US 2003/0145418 A1 Aug. 7, 2003

(30) Foreign Application Priority Data

Jan. 21, 2002 (JP) ............................. 2002-012195

(51) Int. Cl.
*A47L 5/14* (2006.01)
(52) U.S. Cl. ....................................... 15/308; 15/312.1
(58) Field of Classification Search .................. 15/345, 15/308, 309.2, 312.1, 312.2, DIG. 2
See application file for complete search history.

(56) References Cited

U.S. PATENT DOCUMENTS

| 4,707,879 | A | * | 11/1987 | Moszkowski | ................ | 15/345 |
| 4,858,270 | A | * | 8/1989 | Boschung | .................... | 15/328 |
| 5,168,599 | A | * | 12/1992 | Williams | ..................... | 15/346 |
| 2003/0066154 | A1 | * | 4/2003 | Herschberger | ............... | 15/308 |

FOREIGN PATENT DOCUMENTS

| DE | 1786277 | 1/1972 |
| EP | 0 810 039 A2 | 12/1997 |
| JP | SHO 62-132776 | 8/1987 |
| JP | 05169038 A | 7/1993 |
| JP | 10324226 | 12/1998 |

* cited by examiner

*Primary Examiner*—Theresa T. Snider
(74) *Attorney, Agent, or Firm*—Standley Law Group LLP (57) ABSTRACT

In a dust removal apparatus, a front air nozzle unit emits air jets onto a region of a workpiece surface near a rotary brush along a linear front end edge of a hood covering an upper half portion of the rotary brush. Rear air nozzle unit emits air jets onto another region of the workpiece surface near the rotary brush along a linear rear end edge of the hood.

9 Claims, 10 Drawing Sheets

COMPARATIVE EXAMPLE 3

FIG.11B

PREFERRED EXAMPLE 6

DUST REMOVAL APPARATUS

FIELD OF THE INVENTION

The present invention relates to dust removal apparatus for removing foreign dust particles, dirt particles, lint etc. (hereinafter generically referred to as dust particles) from the surface of a workpiece, before painting the surface in order to paint the workpiece surface in satisfactory condition.

In painting a body surface of a motor vehicle, undesired painting defects may result unless dust particles present on the body surface are cleared prior to the painting. To avoid such painting defects, it is necessary to remove dust particles, adhering to the vehicle body surface, using a dust removal apparatus, before actually painting the vehicle body surface.

Among various conventionally-known dust removal apparatus is one that is disclosed in Japanese Utility Model Laid-open Publication No. 62-132776, which will be discussed in detail below.

Figure 13:
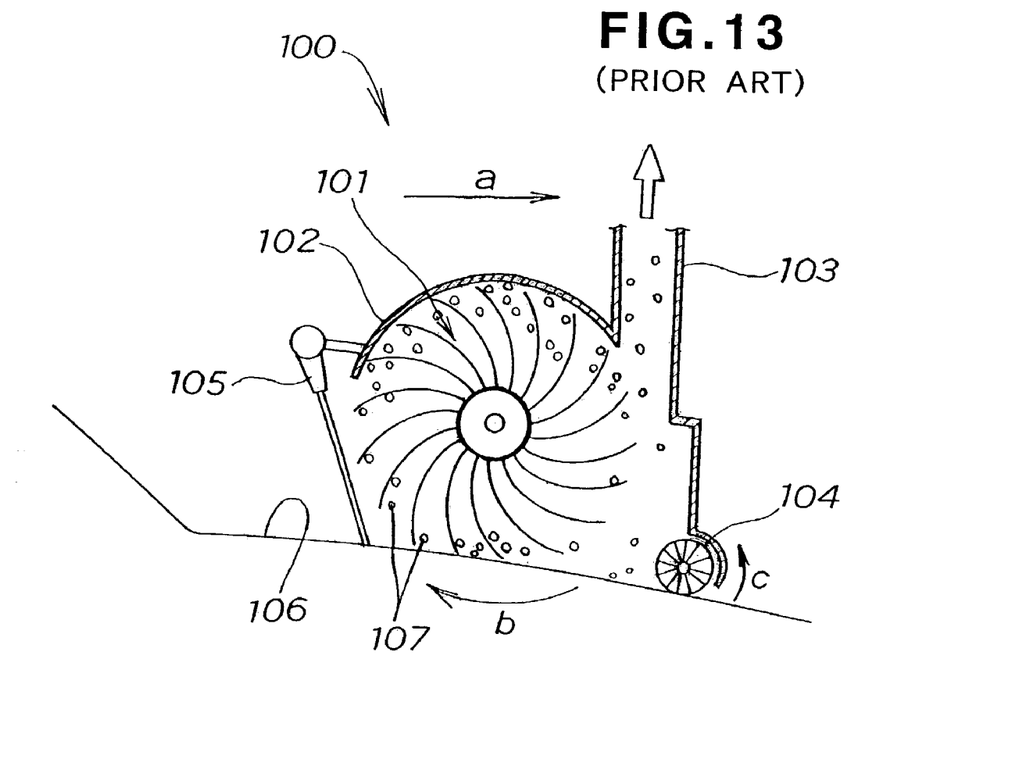
FIG. 13 is a sectional view of the dust removal apparatus.

FIG. 13 is a sectional view of the dust removal apparatus 100 disclosed in the utility model laid-open publication. In the disclosed dust removal apparatus 100, a dust removal brush 101 has an upper half portion covered with a hood 102. Exhaust ducts 103 (only one of which is shown in FIG. 13) are connected to a front end portion of the hood 102, an additional rotary brush 104 is provided adjacent to and along the front lower end of the exhaust ducts 103, and an air nozzle (air blow slit) unit 105 is provided adjacent to the rear end edge of the hood 102.

To remove dust particles 107 from a body surface 106 of a motor vehicle, the dust removal apparatus 100 rotates the dust removal brush 101, as denoted by arrow "b", while traveling in a forward direction denoted by arrow "a". Also, the removal apparatus 100 emits air jets by means of the air nozzle unit 105 while rotating the additional rotary brush 104 as denoted by arrow "c", so that dust particles 107, having adhered to the body surface 106, are detached from or more or less floated off the body surface 106. The thus-detached dust particles 107 are then directed to the exhaust ducts 103 via the rotating removal brush 101.

Simultaneously, the body surface 106 is wiped with the rotating removal brush 101 to cause dust particles 107, first missed by the removal brush 101 and hence left unremoved from the body surface 106, to get detached from or more or less floated off the body surface 106, so that the newly-detached dust particles 107 too can be directed to the exhaust ducts 103. In this way, the dust particles 107 adhering to the vehicle body surface 106 can be removed from the body surface 106 and then discharged through the exhaust ducts 103.

The air jets emitted from the air nozzle unit 105 can also prevent the dust particles 107, detached from the body surface 106, from undesirably escaping to the outside of the removal brush 101. This way, the dust removal apparatus 100 can remove the dust particles 107 from the vehicle body surface 106, with the result that painting defects can be avoided in body-surface painting steps.

However, in the conventional dust removal apparatus 100, which includes the dust removal brush 101 and additional rotary brush 104, there are required two separate drives for the two brushes 101 and 104. The provision of these two brushes 101 and 104 and two drives therefor would considerably complicate the construction of the dust removal apparatus 100 and increase the cost of the removal apparatus 100.

Further, in general, the body surface 106 of each motor vehicle, on which the dust removal operations are to be performed, has projecting and depressed (convex and concave) corner portions and edge portions. Thus, when the additional rotary brush 104 reaches a relatively deep depressed corner portion during travel of the dust removal apparatus 100 relative to the body surface 106, the removal apparatus 100 may be held in the corner portion so that it can no longer go forward and thus the depressed corner portion of the body surface 106 can not be wiped by the dust removal brush 101.

Namely, with the conventional dust removal apparatus 100, it is difficult to cause the two brushes 101 and 104 to reliably contact the vehicle body surface 106 in appropriate condition, so that dust particles 107 can not be removed efficiently from the body surface 106.

Note that the dust removal apparatus 100 of FIG. 13 includes a plurality of exhaust ducts 103 connected to the hood 102 in order to discharge dust particles 107 therethrough by suction force. Example manner in which the exhaust ducts 103 are mounted is illustrated in FIG. 14.

Figure 14:
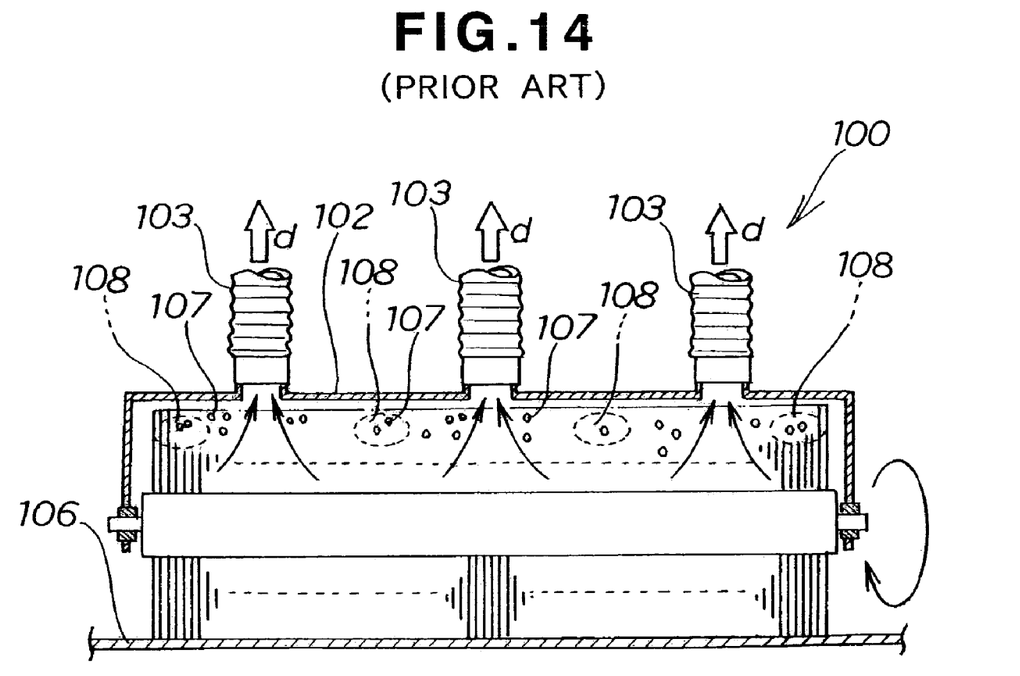
FIG. 14 is a sectional view of a conventional dust removal apparatus.

FIG. 14 is a sectional view of the conventional dust removal apparatus 100, which particularly shows the exhaust ducts 103 connected to the hood 102 at predetermined intervals; similar construction is shown, for example, in Japanese Patent laid-open Publication No. HEI-5-169038. Dust particles 107 present within the hood 102, i.e. in a dust removing space defined by the hood 102, are drawn into the exhaust ducts 103 as indicated by arrows by suction force acting in a direction of arrows "d".

However, with the illustrated construction of FIG. 14, it is difficult for the suction force to sufficiently act on spaces 108 between the exhaust ducts 103, so that dust particles 107 trapped in these spaces 108 can not be discharged through the exhaust ducts 103. Thus, the trapped dust particles 107 would be sent, by the rotating removal brush 101, back to the vehicle body surface 106, which considerably prevents efficient dust removal from the body surface 106.

SUMMARY OF THE INVENTION

In view of the foregoing prior art problems, it is an object of the present invention to provide an improved dust removal apparatus which can efficiently remove dust particles from the surface of a workpiece using simple construction.

To accomplish the above-mentioned object, the present invention provides a dust removal apparatus which comprises: a rotary brush disposed substantially parallel to a workpiece surface from which dust particles are to be removed; a hood of a generally semi-cylindrical shape covering the outer periphery of an upper half portion of the rotary brush, the hood having a pair of opposed side surfaces each having a substantially semicircular shape and linear front and rear end edges; an exhaust duct connected to the hood, the rotary brush being moved, along with the hood, relative to the workpiece surface to thereby remove dust particles from the workpiece surface in such a manner that the removed dust particles are directed to the exhaust duct; a front air nozzle unit for emitting air jets onto a region of the workpiece surface near the rotary brush along the linear front end edge of the hood; and a rear air nozzle unit for emitting air jets onto another region of the workpiece surface near the rotary brush along the linear rear end edge of the hood.

In a specific embodiment, the rear air nozzle unit is secured to a rear end portion of the hood, and the front air nozzle unit is secured to a front end portion of the hood. The front air nozzle unit can form an air curtain in front of the rotary brush by emitting air jets onto the workpiece surface. The thus-formed air curtain can effectively prevent dust particles from scattering forward to the outside of the rotary brush. Therefore, there is no need to provide an extra rotary brush right in front of the hood as in the conventional dust removal apparatus. In addition, by the front air nozzle unit thus emitting air jets onto the region of the workpiece surface near the rotary brush along the linear front end edge of the hood, it is possible to effectively cause dust particles, adhering to the workpiece surface, to get detached from or more or less floated off the workpiece surface. This way, the dust particles can be wiped away by the rotary brush with a significantly increased efficiency.

Preferably, the exhaust duct is connected to the hood via a tapering connection member having an opening of a larger sectional area at one end thereof adjacent to the hood and having an opening of a smaller sectional area at the other end thereof adjacent to the exhaust duct or opposite the hood. The tapering connection member is interposed between the exhaust duct and the hood, and the sectional area of the opening at the one end of the tapering connection member adjacent to the hood is greater than that at the other end adjacent to the exhaust duct. The one end of the tapering connection member, having an opening of the larger sectional area, opens to a predetermined dust removing space defined by the semi-cylindrical hood, so that dust particles floating within the hood (i.e., dust removing space) can be efficiently guided to the exhaust duct.

Preferably, the rotary brush is set to rotate at a speed in a range of 130–170 rpm. When the number of rotations of the rotary brush is below 130 rpm, the rotating speed of the rotary brush is too low to efficiently remove dust particles from the workpiece surface. Thus, the number of rotations of the rotary brush in the present invention is set to 130 rpm or over, in order to remove dust particles from the workpiece surface with an increased efficiency. When, on the other hand, the number of rotations of the rotary brush is greater than 170 rpm, a dust removal rate does not substantially increase as compared to the case where the number of rotations is 170 rpm, although more energy consumption is consumed than in the 170 rpm case. Thus, in the present invention, the maximum number of rotations of the rotary brush is set to 170 rpm, in order to minimize the energy consumption while securing a satisfactory dust removal rate.

In a specific embodiment of the invention, the rear air nozzle unit emits the air jets in a direction inclined rearwardly, relative to the vertical, at an inclination angle in a range of 20–25°. When the inclination angle of the air jet emission by the rear air nozzle unit is below 20°, the inclination angle is too small, so that the air jet emission by the rear air nozzle unit can not appropriately block a wind produced by the rotation of the rotary brush. Therefore, due to the wind produced by the rotation of the rotary brush, dust particles detached from or floated off the workpiece surface may undesirably scatter, through the air jets emitted by the rear air nozzle unit, to the outside of the rotary brush, which would prevent efficient removal of the dust particles from the workpiece surface. Thus, in the present invention, the inclination angle of the air jet emission by the rear air nozzle unit is set to 20° or over, in order to effectively block the wind produced by the rotation of the rotary brush and thereby prevent undesired scattering of dust particles so that dust particles can be efficiently removed from the workpiece surface.

When, on the other hand, the inclination angle of the air jet emission by the rear air nozzle unit is over 25°, the inclination angle is too great, so that the air jets emitted by the rear air nozzle unit go deep into (toward a rotation shaft or hub of) the rotary brush and thus prevent dust particles, detached from or floated off the workpiece surface, from being directed toward and introduced into the exhaust duct. Therefore, in the present invention, the inclination angle of the air jet emission by the rear air nozzle unit is set to 25° or below, in order to effectively prevent the air jets, emitted by the rear air nozzle unit, from going deep into the rotary brush, so that dust particles can be efficiently directed to the exhaust duct by the air jets emitted by the rear air nozzle unit.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
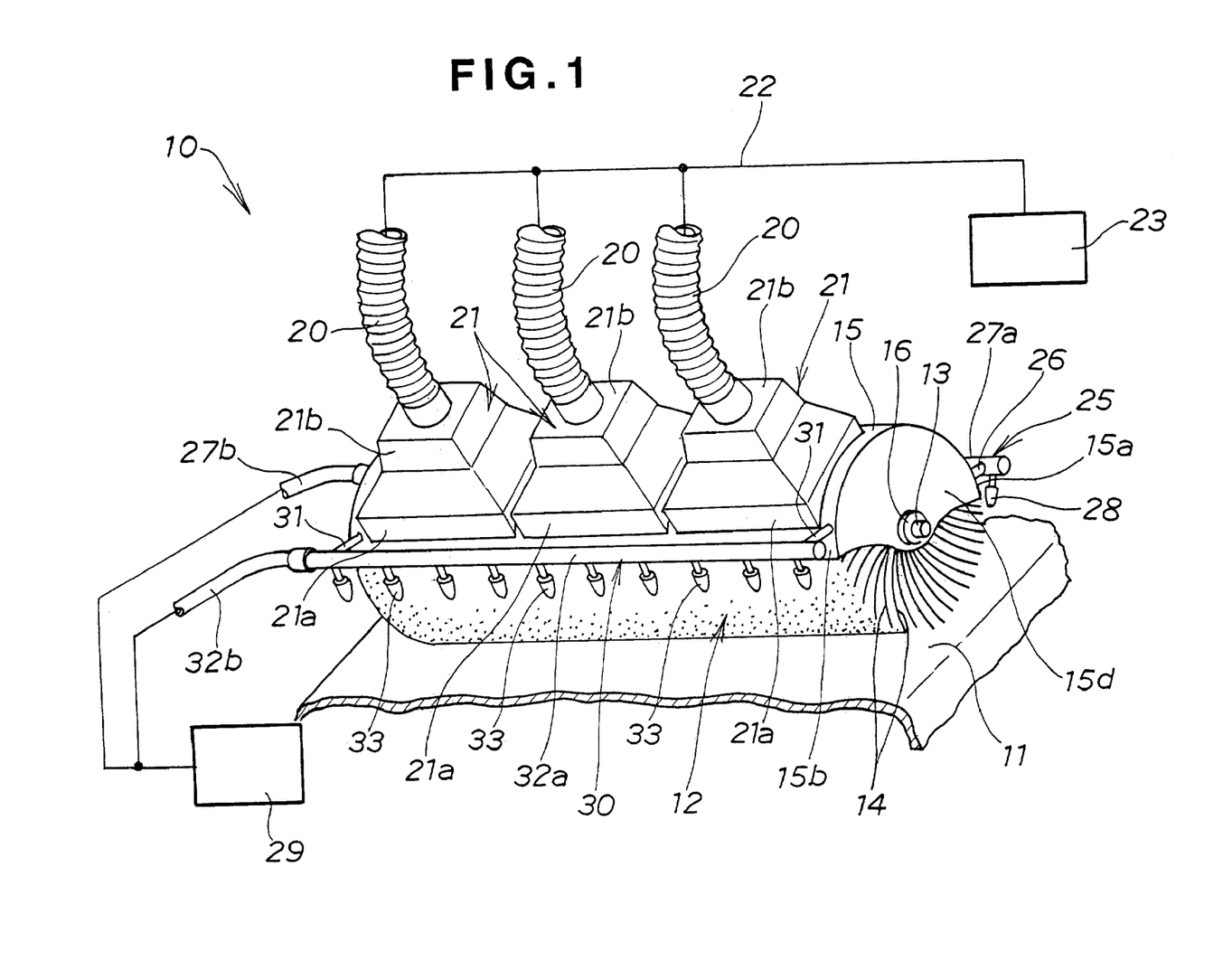
FIG. 1 is a perspective view of a dust removal apparatus in accordance with an embodiment of the present invention.
Figure 2:
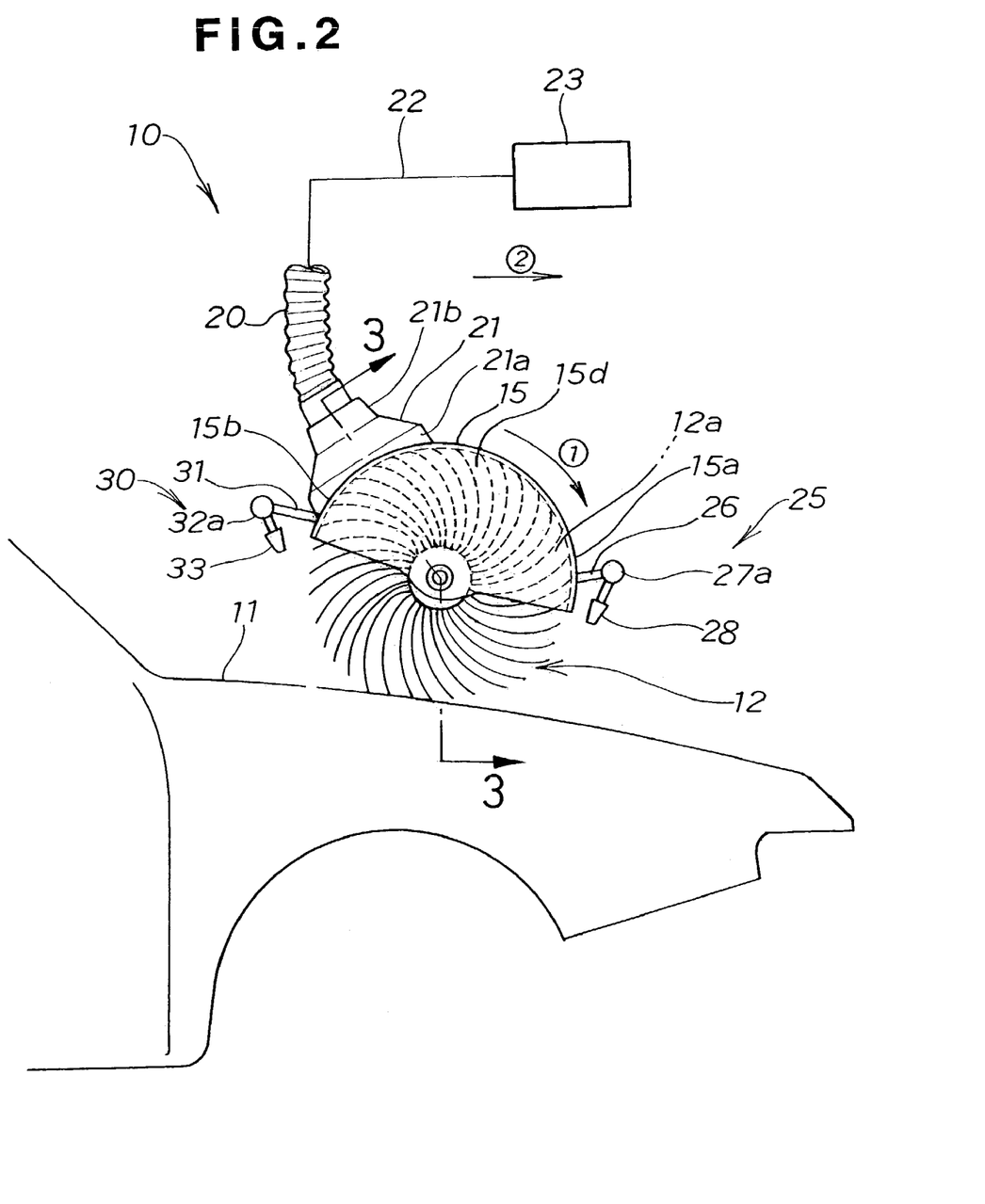
FIG. 2 is a side view of the dust removal apparatus of FIG. 1.

FIG. 1 is a perspective view of a dust removal apparatus in accordance with an embodiment of the present invention, and FIG. 2 is a side view of the dust removal apparatus of FIG. 1.

The dust removal apparatus 10 includes a rotary brush 12 mounted on and along a rotation shaft or hub 13 extending generally parallel to a surface 11 of a workpiece; the rotary brush 12 has a generally cylindrical contour extending perpendicularly to a front-and-rear direction of the apparatus 10. As will be described, the rotary brush 12 is movable in the front-and-rear direction. Upper half portion 12a of the rotary brush 12 is covered with a hood 15 of a semicylindrical shape defining a predetermined dust removing space. The hood 15 has a pair of opposed side surfaces each having a semicircular shape, and linear front and rear end edges 15a and 15b. A plurality of exhaust ducts 20 are connected to the hood 15 in a manner to be described later, and the dust removal apparatus 10 is designed to remove dust particles from the workpiece surface 11 by moving the hood 15 and rotary brush 12 along the workpiece surface 11.

The dust removal apparatus 10 also includes a front air nozzle unit 25 provided along the linear front end edge 15a of the hood 15 for emitting air jets onto a region of the workpiece surface 11 near the rotary brush 12, and a rear air nozzle unit 30 provided along the linear rear end edge 15b of the hood 15 for emitting air jets onto another region of the workpiece surface 11 near the rotary brush 12. As an example, the workpiece surface 11 is a body surface of a motor vehicle.

The rotary brush 12 comprises a multiplicity of brushing hair 14 embedded in the outer periphery of the rotation shaft or hub 13 rotatably mounted at its opposite ends on the hood 15. Specific manner of mounting the rotation shaft 13 on the hood 15 will be detailed later with reference to FIG. 3.

The exhaust ducts 20 are each connected at one end to the hood 15 near the linear rear end edge 15b via a tapering connection member 21 and connected at the other end to a pump 23 via a fluid communication pipe 22. The tapering connection member 21 is shaped in such a manner that one end 21a of the tapering connection member 21 connected to the hood 15 has an opening of a lager sectional area than the other end 21b of the tapering connection member 21 connected to the exhaust duct pipe 20.

Because each of the tapering connection members 21 is mounted on the hood 15 near the linear rear end edge 15b, the one end, i.e. larger open end, 21a of the tapering connection member 21 can be located relatively close to the workpiece surface 11. Thus, dust particles 35 detached from or floated off from the workpiece surface 11 can be efficiently directed, via the rotating rotary brush 12, to the larger open ends 21a of the tapering connection members 21. As a consequence, the dust particles 35 can be efficiently discharged through the larger open ends 21a of the individual tapering connection members 21, which will thereby achieve an enhanced dust removal rate.

The front air nozzle unit 25 includes an air supply pipe 27a that is attached at its opposite ends to the hood 15 near and parallel to the linear front end edge 15a via support rods 26 (only one of them is shown in each of FIGS. 1 and 2). A plurality of front nozzles 28 (only the leftmost one of the front nozzles 28 is shown in each of FIGS. 1 and 2) are connected to the common air supply pipe 27a that is in turn connected to an air supply source 29 via an air supply hose 27b.

Similarly, the rear air nozzle unit 30 includes an air supply pipe 32a that is attached at its opposite ends to the hood 15 near and parallel to the linear rear end edge 15b via support rods 31. A plurality of rear nozzles 33 are connected to the common air supply pipe 32a that is in turn connected to the air supply source 29 via an air supply hose 32b.

In the dust removal apparatus 10 of the present invention, the rotary brush 12 can be rotated via a drive mechanism (not shown) as denoted in FIG. 2 by arrow ①, and transferred in the front-and-rear direction along the workpiece surface 11 via a transfer mechanism (also not shown) as denoted by arrow ②. Simultaneously, the air supply source 29 is activated to allow air jets to be emitted by the front and rear nozzle units 25 and 30. In this way, the dust removal apparatus 10 can emit air jets onto the workpiece surface 11 by means of the front and rear nozzle units 25 and 30 while wiping the workpiece surface 11 by means of the rotary brush 12.

Particularly, in the dust removal apparatus 10 of the present invention, the front air nozzle unit 25 provided along the linear front end edge 15 of the hood 15 can form an air curtain in front of the rotary brush 12 by emitting air jets onto the workpiece surface 11. The thus-formed air curtain can effectively prevent dust particles 35 from undesirably scattering forward to the outside of the rotary brush 12. Thanks to the air curtain, there is no need to provide an extra rotary brush right near the front of the hood as in the above-discussed conventional dust removal apparatus, and it is possible to significantly simplify the construction of the dust removal apparatus 10.

In addition, by the front air nozzle unit 25 emitting air jets onto the region of the workpiece surface 11 near the rotary brush 12, dust particles 35 adhering to the workpiece surface 11 can be detached from or more or less floated off the surface 11 before the surface 11 is wiped by the rotary brush 12. This way, the dust particles 35 on the workpiece surface 11 can be wiped away with an increased efficiency.

Figure 3:
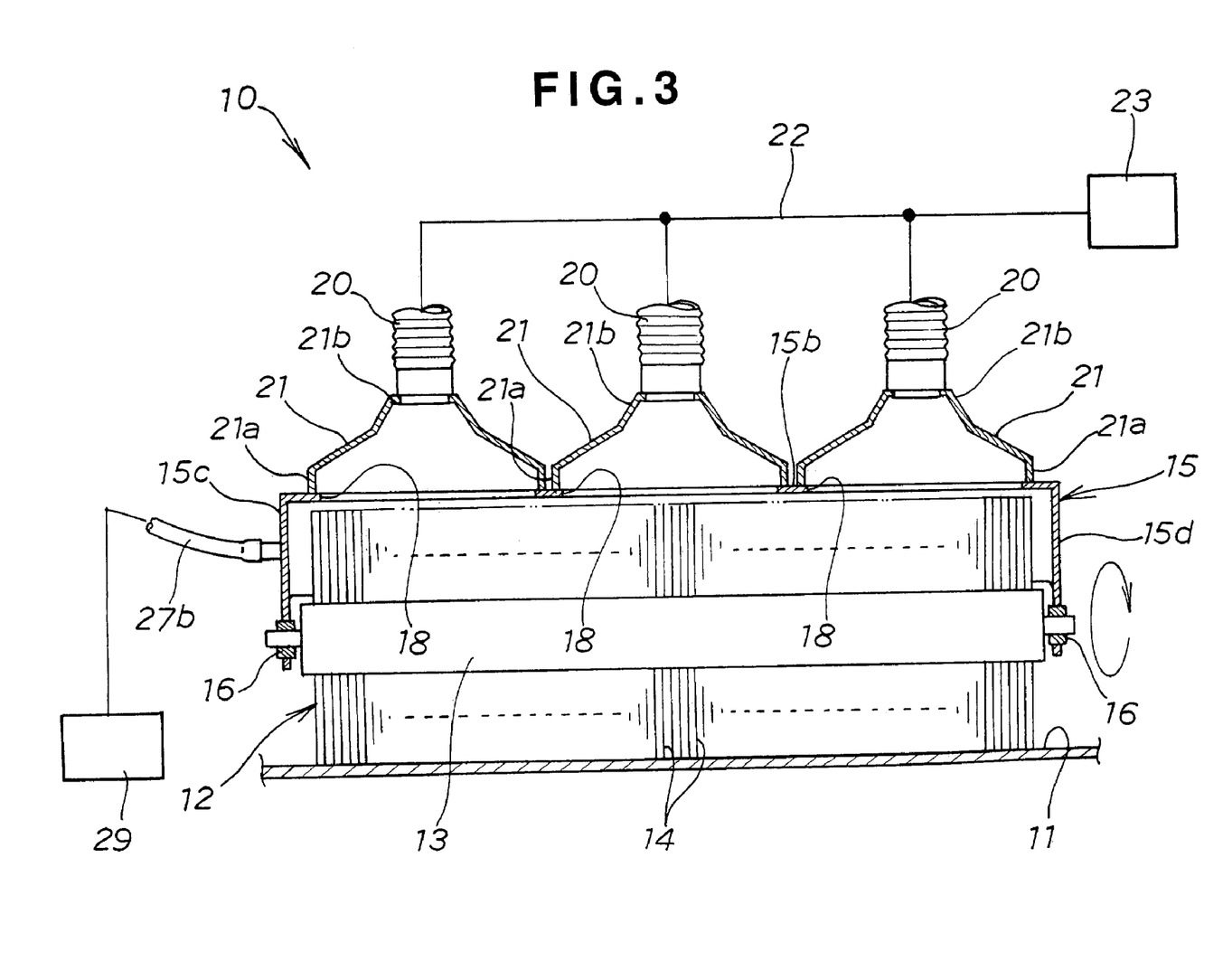
FIG. 3 is a sectional view taken along the 3—3 line of FIG. 2.

FIG. 3 is a sectional view taken along the 3—3 line of FIG. 2, which particularly shows bearings 16 attached to the semicircular left and right side walls 15c and 15d and the rotation shaft 13 of the rotary brush 12 rotatably supported by the hood 15 at its opposite ends via the respective bearings 16. It is also seen in FIG. 3 that the multiplicity of brushing hair 14 is embedded in the periphery of the rotation shaft 13 and the exhaust ducts 20 are each connected at its one end to the hood 15 near the linear rear edge 15b via the tapering connection member 21. The rotation shaft 13 is rotatable via the drive mechanism (not shown) as denoted by an arrow in the figure.

The rear end edge portion (for convenience, denoted by the same reference numeral 15b as the rear end edge) of the hood 15 has three openings 18 formed therein at predetermined intervals, and each of the openings 18 is smaller in size than the larger open end 21a of the tapering connection member 21. These openings 18 are covered with the larger open ends 21a of the respective tapering connection members 21, and the exhaust ducts 20 are connected to the smaller open ends 21a of the corresponding tapering connection members 21. Since the opening of the larger open end 21a adjacent to the hood 15 is greater in size than the opening of the smaller open end 21b, each of the tapering connection members 21 is tapered in such a manner that the sectional area of an air passage formed therethrough becomes gradually smaller in a direction from the larger open end 21a to the smaller open end 21b.

Now, a description will be made about relationships between the number of rotations (revolutions) of the rotary brush 12 and velocity of wind caused by the rotation of the rotary brush 12 and between the number of rotations of the rotary brush 12 and dust removable rate of the apparatus 10, with primary reference to FIG. 4 and TABLE 1.

Figure 4:
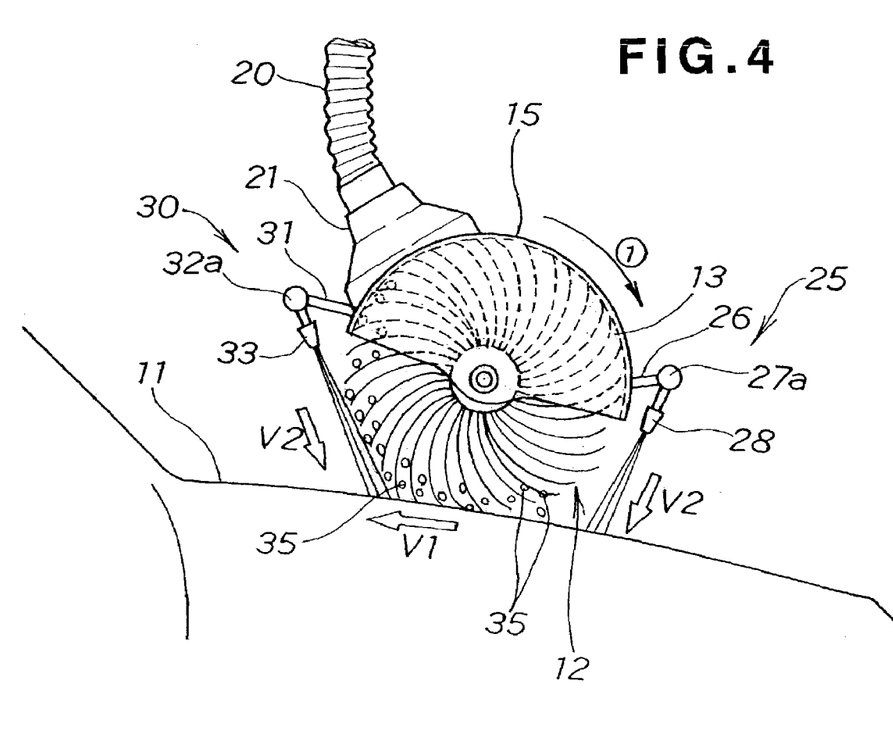
FIG. 4 is a view explanatory of an example manner in which the dust removal apparatus of the present invention removes dust particles from a workpiece surface.

FIG. 4 is a view explanatory of an example manner in which the dust removal apparatus 10 of the present invention operates to remove dust particles from a workpiece surface 11. As the rotary brush 12 is rotated in the direction of arrow ①, a wind (or wind velocity) V1 occurs along the workpiece surface 11. When the wind velocity V1 thus caused by the rotation of the rotary brush 12 becomes high enough, it is possible that dust particles 35 undesirably scatter due to the wind V1; therefore, it is preferable that the wind velocity V1 be minimized. Thus, for efficient removal of the dust particles 35, it is important to ascertain relationships between the number of rotations of the rotary brush 12 and the velocity of wind caused by the rotating brush 12 and between the number of rotations of the rotary brush 12 and the dust removable rate.

The following paragraphs set forth a relationship between the velocity of wind V1 caused by the rotating brush 12 and the dust removable rate, on the basis of results of tests conducted for comparing example 1 and comparing example 2 and preferred example 1 to preferred example 5 of the invention. In each of the tests, the rotary brush 12 was rotated with the front and rear air nozzles 25 and 30 completely deactivated, so as to determine dust removal rates achieved by the rotation of the rotary brush 12 alone.

TABLE 1

| | Rotations of Brush (rpm) | Dust Removal Rate (%) | Wind Velocity (V1) (m/s) | Evaluation |
|---|---|---|---|---|
| Comparing Example 1 | 110 | 30 | 0.4 | X |
| Preferred Example 1 | 130 | 40 | 0.6 | ○ |
| Preferred Example 2 | 140 | 40 | 0.8 | ○ |
| Preferred Example 3 | 150 | 40 | 1.5 | ○ |
| Preferred Example 4 | 160 | 45 | 1.6 | ○ |
| Preferred Example 5 | 170 | 50 | 1.7 | ○ |
| Comparing Example 2 | 180 | 50 | 1.9 | X |

As indicated in TABLE 1 above, in comparing example 1, the rotary brush 12 was rotated at a speed of 110 rpm (revolutions per minute). In this example, the dust removal rate at which dust particles 35 were removed from the workpiece surface 11 was 30%, and the wind velocity V1 was 0.4 m/s.

In preferred example 1, the rotary brush 12 was rotated at a rate of 130 rpm. In this example, the dust removal rate was 40%, and the wind velocity V1 was 0.6 m/s.

In preferred example 2, the rotary brush 12 was rotated at a rate of 140 rpm. In this example, the dust removal rate was 40%, and the wind velocity V1 was 0.8 m/s.

In preferred example 3, the rotary brush 12 was rotated at a rate of 150 rpm. In this example, the dust removal rate was 40%, and the wind velocity V1 was 1.5 m/s.

In preferred example 4, the rotary brush 12 was rotated at a rate of 160 rpm. In this example, the dust removal rate was 45%, and the wind velocity V1 was 1.6 m/s.

In preferred example 5, the rotary brush 12 was rotated at a rate of 170 rpm. In this example, the dust removal rate was 50%, and the wind velocity V1 was 1.7 m/s.

In comparing example 2, the rotary brush 12 was rotated at a rate of 180 rpm. In this example, the dust removal rate was 50%, and the wind velocity V1 was 1.9 m/s.

For evaluation of the test results of comparing example 1 and preferred example 1 to preferred example 5, a threshold value of the dust removal rate was set to 40%, and the dust removal rates equal to and higher than 40% were evaluated as "○" (satisfactory) while the dust removal rates lower than 40% were evaluated as "X" (unsatisfactory). Therefore, the test results of comparing example 1 were evaluated as "X" and the test results of preferred example 1 to preferred example 5 were evaluated as "○".

Because the dust removal rate was greater than the 40% threshold, the test results of comparing example 2 should have been evaluated as "○" or satisfactory; besides, the test results of preferred embodiment 5 and comparing example 2 both showed the same dust removal rate of 50%. However, in comparing example 2, the number of rotations of the rotary brush 12 was greater than that in preferred example 5, and thus more energy was consumed. Namely, when the number of rotations of the rotary brush 12 was greater than 170 rpm, the dust removal rate did not increase as compared to the case where the number of rotations was 170 rpm, although more energy was consumed. This is why the test results of comparing example 2 were evaluated as "X".

From TABLE 1 above, it can be seen that dust particles 35 can be removed efficiently by setting the number of rotations of the rotary brush 12 to 130 rpm or more. Because, when the number of rotations of the rotary brush 12 is below 130 rpm, the rotating speed of the rotary brush 12 is too low to efficiently remove dust particles 35 from the workpiece surface 11.

Preferred embodiment 5 and comparing example 2 both showed the same dust removal rate of 50% as noted earlier, from which it can been seen that increasing the number of rotations of the rotary brush 12 above 170 rpm can not increase the dust removal rate above 50%. Thus, in order to reduce the energy consumption necessary for rotating the rotary brush 12, the present invention is arranged to restrict the number of rotations of the rotary brush 12 to 170 rpm or below.

For the reasons stated above, the number of rotations of the rotary brush 12 is set to a range of 130 to 170 rpm in the present invention.

Figure 5:
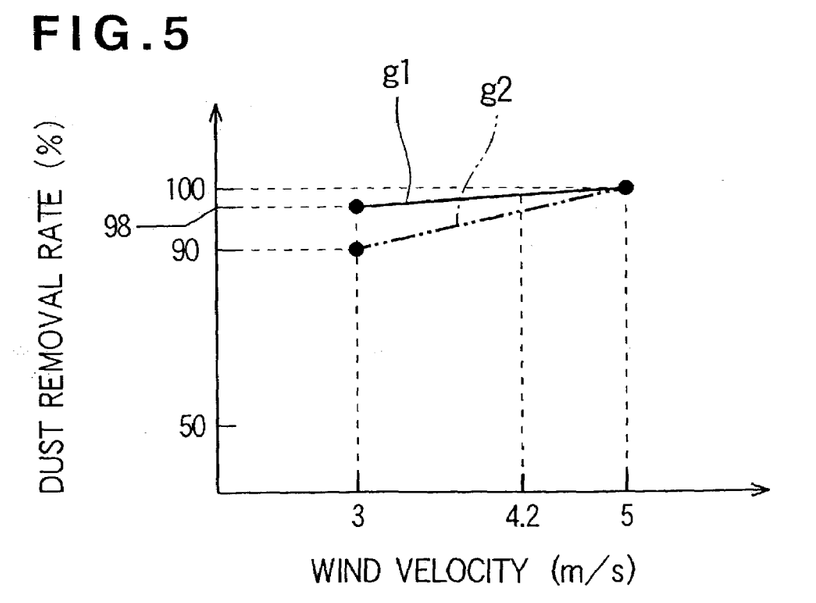
FIG. 5 is a graph showing a relationship between a wind velocity caused by front and rear air nozzle units emitting air jets and a dust removal rate.

The following paragraphs set forth a relationship between a wind velocity V2 caused by the front and rear air nozzle units 25 and 30 emitting air jets and a dust removal rate at which dust particles 35 can be blown off the workpiece surface 11 through the air jets, with reference to FIGS. 4 and 5.

As shown in FIG. 4, a wind velocity V2 is produced by the front air nozzle unit 25 emitting air jets onto a region of the workpiece surface 11 near the rotary brush 12. Similarly, a same wind velocity V2 is produced by the rear air nozzle unit 30 emitting air jets onto another region of the workpiece surface 11 near the rotary brush 12. In this instance, the rotary brush 12 is rotated at the speed of 170 rpm.

FIG. 5 is a graph showing a relationship between the wind velocity V2 caused by the front and rear air nozzle units 25 and 30 emitting air jets and the dust removal rate. In this graph, the dust removal rate (%) is represented on the vertical axis, while the wind velocity V2 is represented on the horizontal axis V2 (m/s).

In FIG. 5, a solid line g1 shows a variation in a case where dust particles 35, such as lint of nylon and cotton, are removed from the workpiece surface 11. The solid line g1 shows that the rate of dust removal from the workpiece surface 11 is 98% when the wind velocity V2 produced by the air jets emitted from the front and rear air nozzle units 25 and 30 is 3 m/s and 100% when the wind velocity V2 is 5 m/s.

Phantom line g2 represents a variation in a case where dust particles, such as sealer particles and particles produced by abrasion, are removed from the workpiece surface 11. In this example, the rate of dust removal from the workpiece surface 11 is 90% when the wind velocity V2 produced by the air jets emitted from the front and rear air nozzle units 25 and 30 is 3 m/s and 100% when the wind velocity V2 is 5 m/s.

From the lines g1 and g2, it can be seen that, by the front and rear air nozzle units 25 and 30 emitting air jets so that the wind velocity V2 becomes 5 m/s, it is possible to effectively blow dust particles 35, such as lint of nylon and cotton or sealer particles and abrasion particles, away from the workpiece surface 11. Therefore, the front and rear air nozzle units 25 and 30 were set to emit air jets such that the wind velocity V2 becomes 5 m/s.

Here, it appears that the wind velocity V2 may exceed 5 m/s without causing inconveniences, if only the purpose of efficiently blowing dust particles 35 away from the workpiece surface 11 is considered. However, the dust particles 35 will undesirably scatter if the wind velocity V2 is too high, and thus the upper limit of the wind velocity V2 in the instant embodiment is set to 5 m/s.

Next, a description will be given about air jet emission angles of the front and rear air nozzle units 25 and 30, with reference to FIGS. 6 and 7.

Figure 6:
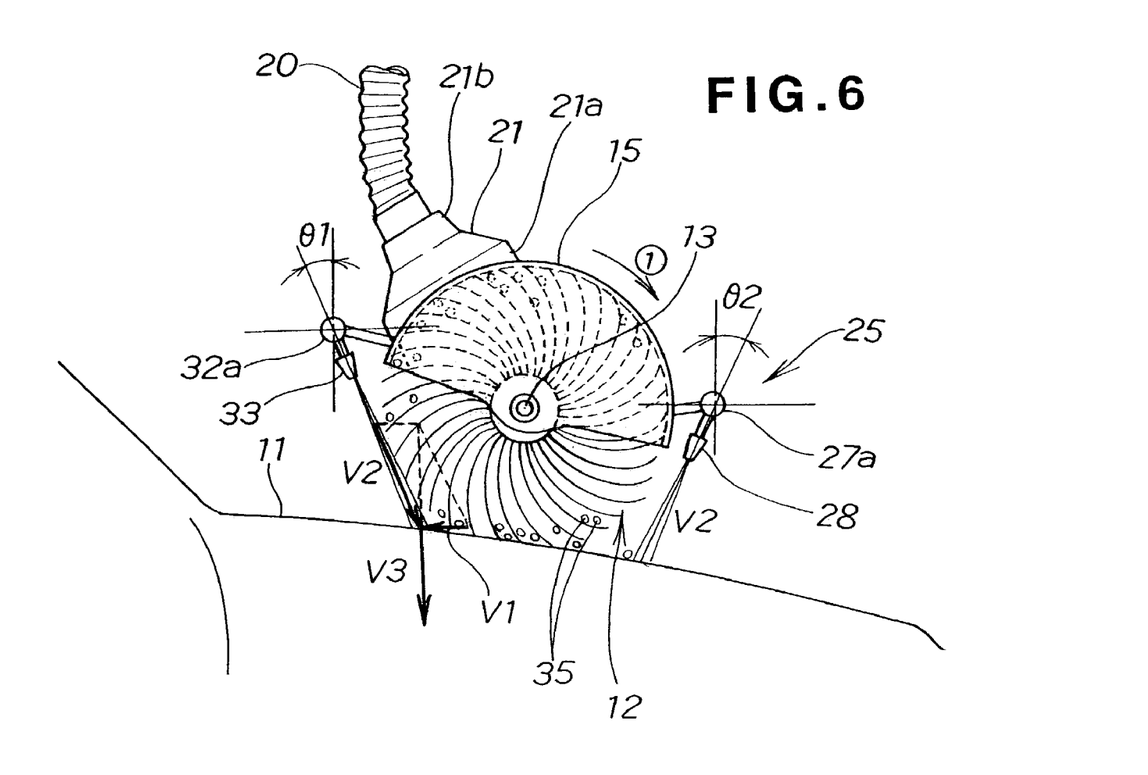
FIG. 6 is a side view of the dust removal apparatus of the present invention.

FIG. 6 is a side view of the dust removal apparatus 10 of the present invention. As shown, the wind velocity V1 is produced by the rotary brush 12 being rotated in a direction of arrow ①, and the wind velocity V2 is produced by the rear air nozzle unit 30 emitting air jets. The wind velocity V1 and wind velocity V2 combine into a wind velocity V3. It is preferable that the wind velocity V3 acts downwardly along the vertical as shown, for the following reasons.

Figure 7A:
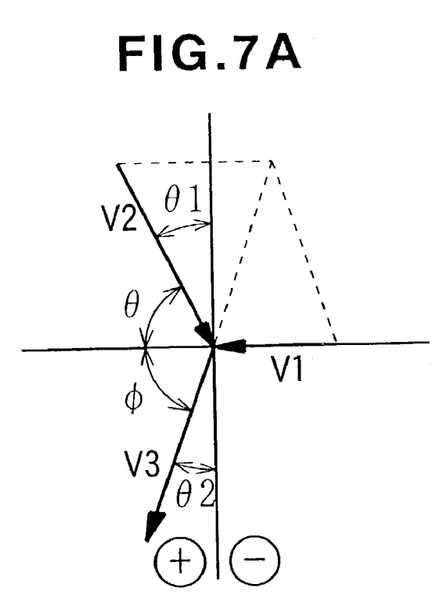
FIGS. 7A and 7B are explanatory of relationships between a wind velocity produced by rotation of a rotary brush of the dust removal apparatus and a velocity of wind produced by air jet emission from the rear air nozzle unit.
Figure 7B:
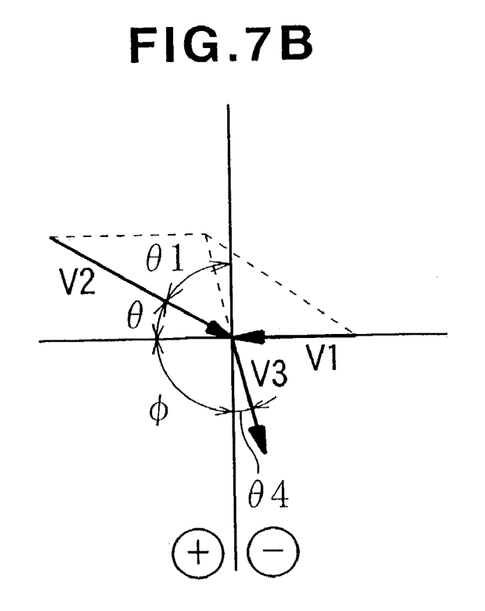

FIGS. 7A and 7B are explanatory of relationships between the wind velocity produced by the rotation of the rotary brush of the inventive dust removal apparatus and the wind velocity produced by the air jet emission from the rear air nozzle unit 30. As shown in FIG. 7A, if an inclination angle θ1 of the wind V2 produced by the air jet emission from the rear air nozzle unit 30 (i.e., inclination angle θ1 of the air jet emission from the rear air nozzle unit 30) is too small, the wind velocity V3 acts outwardly away from the rotary brush 12. Therefore, it can be seen that too small an inclination angle θ1 of the wind velocity V2 can not appropriately allow the wind velocity V2 to block the wind velocity V1 produced by the rotation of the rotary brush 12. In the case where the wind velocity V2 can not appropriately block the wind velocity V1 like this, dust particles 35, detached from or more or less floated off the workpiece surface 11, may undesirably scatter to the outside of the rotary brush 12, which will make it difficult to efficiently remove the dust particles 35 from workpiece surface 11.

As shown in FIG. 7B, if the inclination angle θ1 of the wind V2 produced by the air jet emission from the rear air nozzle unit 30, is too great, the wind velocity V3 acts inwardly toward the rotary brush 12. Therefore, it can be seen that too great an inclination angle θ1 of the wind velocity V2 tends to cause the air jets to go deep into (toward the rotation shaft of) the brush 12. In case where the wind velocity V2 enters the rotary brush 12, dust particles 35 floated off the workpiece surface 11 may scatter due to the wind velocity V2, which will make it difficult to efficiently remove the dust particles 35.

From the foregoing, it can be seen that if the wind velocity V3, produced by the combination of the wind velocity V1 and wind velocity V2, is set to act downwardly along the vertical, i.e. such that the angle φ of the wind V3 relative to the horizontal is 90°.

Assuming here that the angle of the wind V2 relative to the horizontal is represented by θ, the following relationship can be established between the angle φ and the inclination angle θ1:

$$\phi = \tan^{-1}\{V2 \times \sin\theta/(V1-V2\cos\theta)\} > 90° \qquad (1)$$

Figure 8:
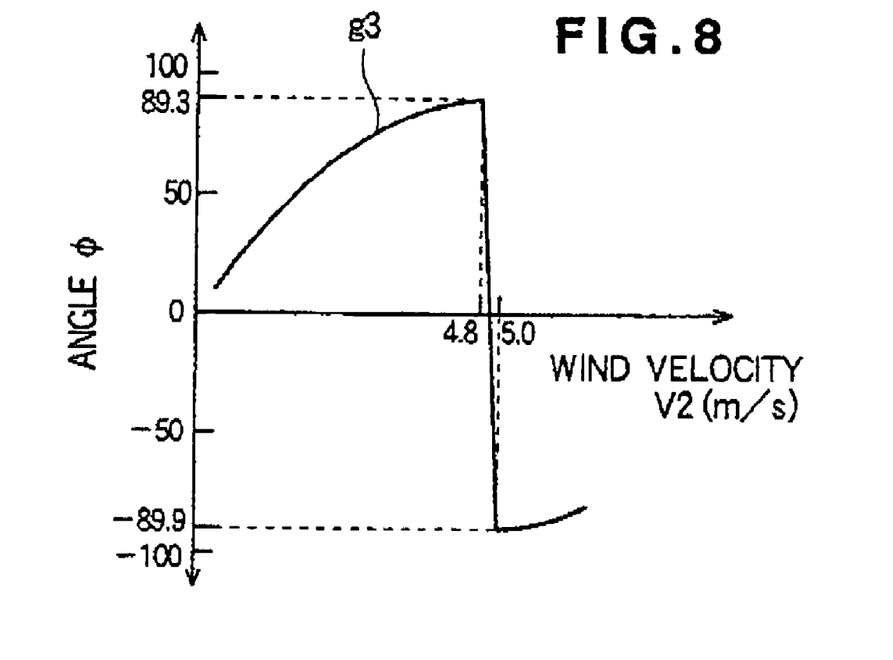
FIG. 8 is a graph indicative of a relationship between the velocity of wind produced by the rear air nozzle unit emitting air jets and an angle of the wind.

If the angle θ is set to 70° and the wind velocity V1 is set to 1.7 m/s (see TABLE 1) and when the wind velocity V2 is varied within a range of 0.2–6.2 m/s, the angle φ of the wind velocity V3 relative to the horizontal varies as indicated in a graph of FIG. 8.

FIG. 8 is a graph indicative of a relationship between the wind velocity V2 produced by the rear air nozzle unit 30 emitting air jets and the angle φ of the wind velocity V3, where the vertical axis represents the wind velocity V3 while the horizontal axis represents the wind velocity V2.

As indicated by a variation curve g3, the angle φ of the wind velocity V3 is 89.3° when the wind velocity V2 is 4.8 m/s, and −89.9° when the wind velocity V2 is 5.0 m/s. When the angle φ is 89.3°, the wind velocity V3 takes a positive value as shown in FIG. 7A and acts substantially in the vertical direction. When the angle φ is 89.9°, the wind velocity V3 takes a negative value as shown in FIG. 7B and acts substantially in the direction of the vertical.

Therefore, it can be seen that setting the angle θ of the air jet emission by the rear air nozzle unit 30 relative to the horizon to 70° and simultaneously setting the wind velocity V2 to 5 m/s will allow the wind velocity V2, produced by the rear air nozzle unit 30 emitting air jets, to effectively block the wind velocity V1 produced by the rotation of the rotary brush 12. Here, because the relationship between the angle θ, relative to the horizon, of the air jet emission by the rear air nozzle unit 30 and the inclination angle θ1 can be expressed by θ=90°−θ1, the inclination angle θ1 of the rear air nozzle unit 30 can be calculated as 20°.

Figure 9:
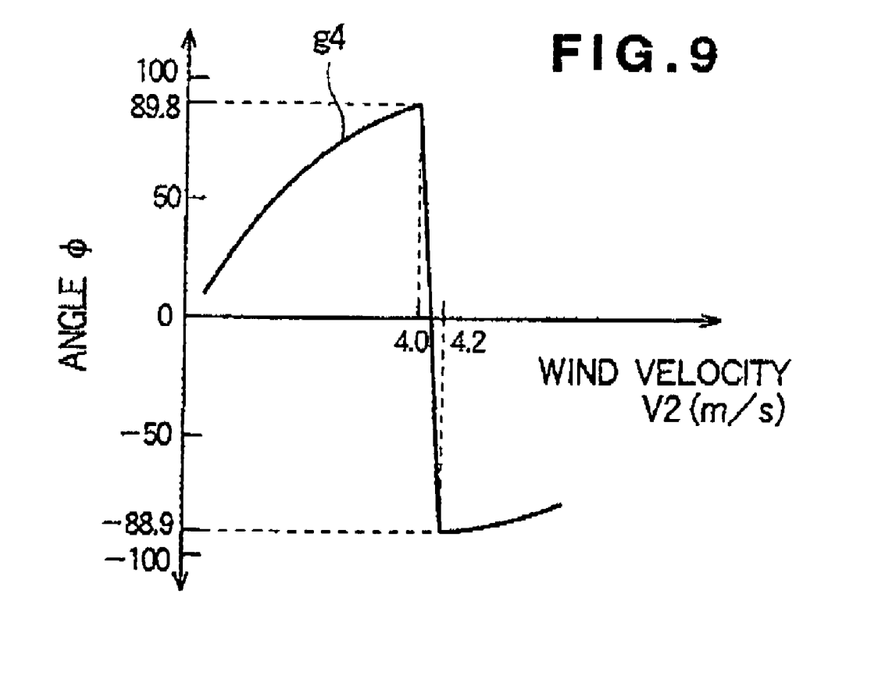
FIG. 9 is a graph indicative of another example of a relationship between the velocity of wind produced by the rear air nozzle unit emitting air jets and the angle of the wind.

FIG. 9 is a graph indicative of another example of a relationship between the wind velocity V2 produced by the rear air nozzle unit 30 emitting air jets and the angle φ of the wind velocity V3, where the vertical axis represents the wind velocity V3 while the horizontal axis represents the wind velocity V2.

If the angle θ is set to 65° and the wind velocity V1 is set to 1.7 m/s (see TABLE 1) and when the wind velocity V2 is varied within a range of 0.2–6.2 m/s, the angle φ of the wind velocity V3 relative to the horizontal varies as indicated in a graph of FIG. 9.

As indicated by a variation curve g4, the angle φ of the wind velocity V3 is 89.8° when the wind velocity V2 is 4.0 m/s, and −88.9° when the wind velocity V2 is 4.2 m/s. When the angle φ is 89.8°, the wind velocity V3 takes a positive value as shown in FIG. 7A and acts substantially in the direction of the vertical. When the angle φ is 88.9°, the wind velocity V3 takes a negative value as shown in FIG. 7B and acts substantially in the direction of the vertical.

Therefore, it can be seen that setting the angle θ relative to the horizontal to 65°, i.e. setting the inclination angle θ1 of the air emission of the rear air nozzle unit 30 five degrees greater than that of FIG. 8, will allow the wind velocity V2, produced by the rear air nozzle unit 30 emitting air jets, to effectively block the wind velocity V1 produced by the rotation of the rotary brush 12, even if the window velocity V2 is set to 4.2 m/2. Here, because the relationship between the angle θ of the wind velocity V2 and the inclination angle θ1 of the rear air nozzle unit 30 can be expressed by θ=90°−θ1, the inclination angle θ1 of the air jet emission of the rear air nozzle unit 30 can be calculated as 25°.

As indicated by the graph of FIG. 8, when the inclination angle θ1 of the air jet emission of the rear air nozzle unit 30 is 20°, it is only necessary that the wind velocity V2, produced by the rear air nozzle unit 30 emitting air jets, be set to 5.0 m/s. Further, as indicated by the graph of FIG. 9, when the inclination angle θ1 of the air jet emission of the rear air nozzle unit 30 is 25°, it is only necessary that the wind velocity V2, produced by the rear air nozzle unit 30 emitting air jets, be set to 4.2 m/s.

Referring back to FIG. 5, the lines g1 and g2 indicate that, although it is necessary to set the wind velocity V2 to 5.0 m/s in order to blow 100% of dust particles 35 away from the workpiece surface 11, almost 100% of the dust particles 35 can be blown away from the workpiece surface 11 even when the wind velocity V2 is lowered to 4.2 m/s.

For the foregoing reasons, the air jet emission of the rear air nozzle unit 30 in the dust removal apparatus 10 of the invention is inclined rearwardly relative to the vertical at an angle within a range of 20–25°.

Namely, when the inclination angle θ1 of the rear air nozzle unit 30 is below 20°, the wind velocity V2 has to be set to a value greater than 5.0 m/s, in order to appropriately block the wind velocity V1 produced by the rotation of the rotary brush 12. However, the wind velocity V2 exceeding 5.0 m/s is too high so that dust particles 35 may undesirably scatter to the outside of the rotary brush 12. Thus, the dust removal apparatus 10 is constructed to prevent the undesired scattering of dust particles 35, by setting the inclination angle θ1 of the air jet emission of the rear air nozzle unit 30 to 20° or over and setting the wind velocity V2 to a value below 5.0 m/s.

On the other hand, when the inclination angle θ1 of the air jet emission of the rear air nozzle unit 30 exceed 25°, the wind velocity V2 has to be lowered below 4.2 m/s. However, the wind velocity V2 below 4.2 m/s is too low to appropriately blow dust particulates 35 away from the workpiece surface 11, as shown in FIG. 5.

Further, if the wind velocity V2 is set to 5 m/s with the inclination angle θ1 of the air jet emission of the rear air nozzle unit 30 exceeding 25°, the air jetted from the rear air nozzle unit 30 goes deep into the rotary brush 12 (toward the center of the brush 12), by which dust particulates 35 detached from or floated above the workpiece surface 11 are caused to scatter. As a consequence, the dust particulates 35 detached from or floated above the workpiece surface 11 can not be efficiently directed to the exhaust ducts 20.

Therefore, the dust removal apparatus 10 is constructed to effectively blow dust particulates 35 from the workpiece surface 11, by setting the inclination angle θ1 of the air jet emission of the rear air nozzle unit 30 so as not to exceed 25° and setting the wind velocity V2 to exceed 4.2 m/s.

Figure 10:
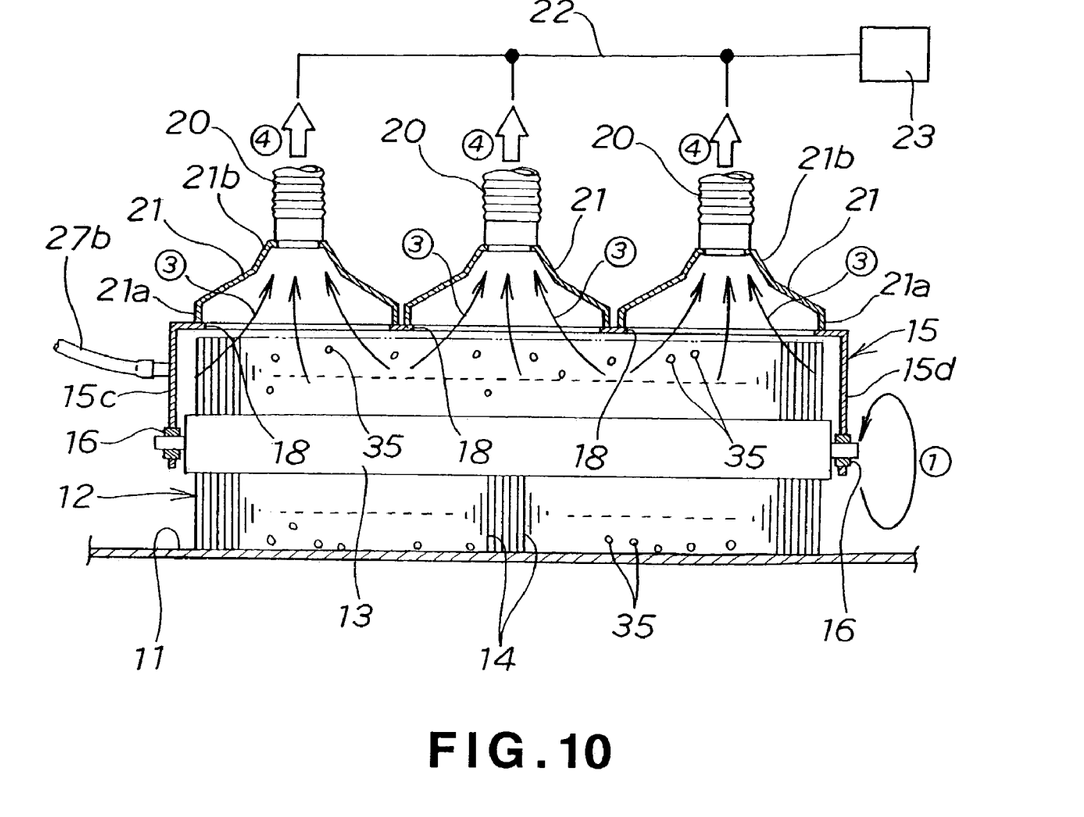
FIG. 10 is a sectional view explanatory of behavior the dust removal apparatus of the present invention.
Figure 11A:
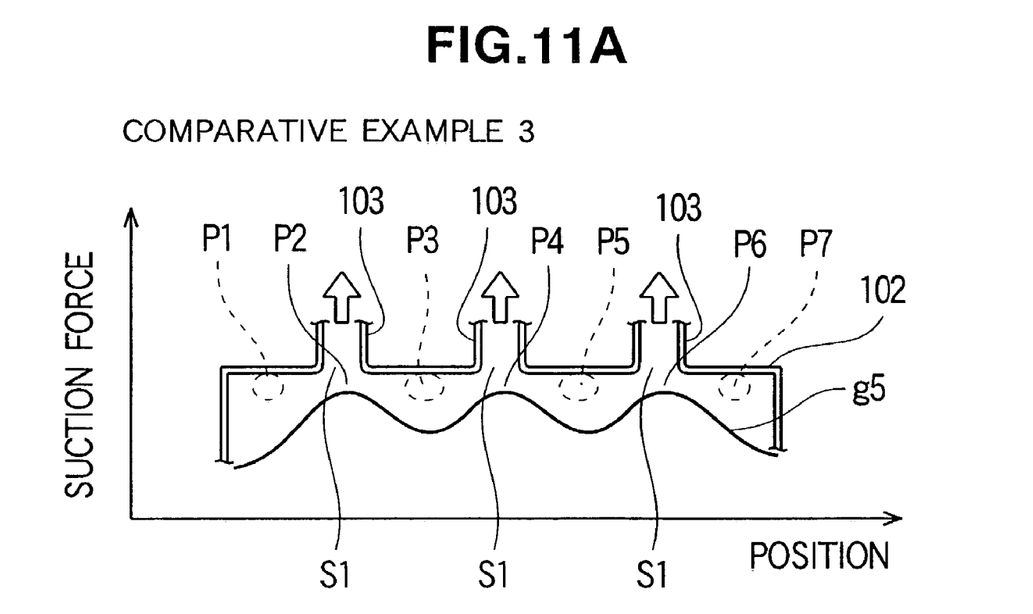
FIGS. 11A and 11B are views explanatory of example manners in which dust particles within a hood covering the rotary brush are drawn into exhaust ducts.
Figure 11B:
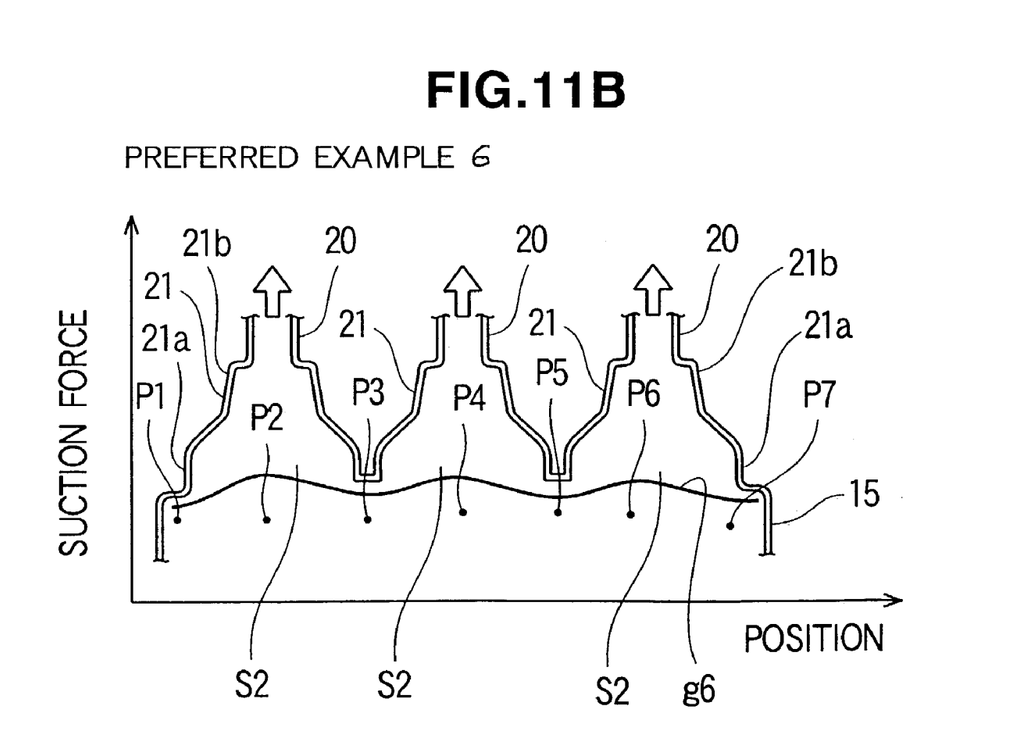

The following paragraphs describe an example manner in which dust particulates 35 within the predetermined dust removing space defined by the hood 15 are drawn into the exhaust ducts 20 in the instant embodiment, with reference to FIGS. 10–11 and TABLE 2.

FIG. 10 is a sectional view explanatory of behavior of the dust removal apparatus 10 of the present invention. The rotary brush 12 is rotated in a direction of arrow ① to wipe dust particulates 35 from the workpiece surface 11, and the thus-wiped dust particulates 35 are delivered via the rotating brush 12 toward the exhaust ducts 20.

While the rotary brush 12 is being rotated, the pump 23 is activated to draw the dust particulates 35 from within the hood 15 (i.e., predetermined dust removing space defined by the hood 15) into the exhaust ducts 20 by way of the tapering connection members 21 as denoted by arrows ③. The thus drawn-in dust particulates 35 are led to and discharged via the communication pipe 22 as denoted by arrows ④.

Because the larger open end 21a of each of the tapering connection members 21 has an opening of a relatively large sectional area, the dust particulates 35 within the hood 15 can be efficiently drawn via the tapering connection members 21 into the exhaust ducts 20.

FIGS. 11A and 11B are graphs explanatory of example manners in which dust particles within the hood are drawn into the exhaust ducts. Specifically, FIG. 11A shows a conventional technique as comparing example 3 and FIG. 11B shows preferred example 6 of the present invention, in which the vertical axis represents pressure while the horizontal axis represents a position.

In comparing example 3 of FIG. 11A, dust particles within the hood 102 are drawn into the exhaust ducts 103 through suction force applied to the ducts 103. However, because the opening of the exhaust ducts 103 each have a relatively small sectional area S1, there would be caused considerable stagnation of the dust particles at positions (P1, P3, P5 and P7) in between the exhaust ducts 103 remote from the openings of the ducts 103, despite the suction force applied to the ducts 103 as denoted by upward arrows.

TABLE 2

| Position | | P1 | P2 | P3 | P4 | P5 | P6 | P7 | Evaluation |
|---|---|---|---|---|---|---|---|---|---|
| Window Velocity (m/s) | Comparing Example 3 | 1.1 m/s | 2.5 m/s | 1.3 m/s | 2.7 m/s | 1.0 m/s | 2.3 m/s | 1.0 m/s | X |
| | Preferred Example 6 | 2.3 m/s | 2.5 m/s | 2.4 m/s | 2.7 m/s | 2.3 m/s | 2.6 m/s | 2.3 m/s | ○ |

Namely, when the suction force is applied to the exhaust ducts 103 in comparing example 3, the wind velocity is 1.1 m/s at position P1, 2.5 m/s at position P2, 1.3 m/s at position P3, 2.7 m/s at position P4, 1.0 m/s at position P5, 2.3 m/s at position P6 and 1.0 m/s at position P7, as indicated by TABLE 2.

With comparing example 3, the wind velocities at the positions (P1, P3, P5 and P7) remote from the individual exhaust ducts 103 remain relatively low, although the wind velocities at other positions (P2, P4 and P6) right beneath the individual exhaust ducts 103 can be increased to a relatively high value. Thus, there would be caused stagnation of dust particles at the remote positions (P1, P3, P5 and P7), and the dust particles present at the remote positions (P1, P3, P5 and P7) can not be drawn into the exhaust ducts 103. Therefore, comparing example 3 is evaluated as "X" (unsatisfactory).

Namely, as indicated by a curve g5 of FIG. 11A, the suction force can not be increased at the remote positions (P1, P3, P5 and P7) because the wind velocities at these remote positions are low. Therefore, dust particles floating at these positions (P1, P3, P5 and P7) can not be drawn into the exhaust ducts 103. Thus, the dust particles would be left at the remote positions, then forced back to the workpiece surface 11 via the removal brush and again adhere to the workpiece surface 11. As a consequence, comparing example 3 can not efficiently remove dust particles from the workpiece surface 11.

In preferred example 6 of FIG. 11B, suction force is applied to the exhaust ducts 20 to draw dust particles into the exhaust ducts 20. Because the larger open end 21a of each of the tapering connection members 21 has an opening of a relatively large sectional area, the dust particulates 35 floating within the hood 15 can be efficiently drawn via the tapering connection members 21 into the exhaust ducts 20.

Specifically, when the suction force is applied to the exhaust ducts 20, the wind velocity is 2.3 m/s at position P1, 2.5 m/s at position P2, 2.4 m/s at position P3, 2.7 m/s at position P4, 2.3 m/s at position P5, 2.6 m/s at position P6 and 2.3 m/s at position P7.

With preferred example 6, the wind velocity can be increased substantially uniformly throughout the entire dust removing space within the hood (at all the positions (P1 to P7)), so that the dust particulates can be drawn substantially uniformly into the exhaust ducts 20. As a consequence, preferred example 6 can significantly increase the rate of dust removal from the workpiece surface 11. Therefore, preferred example 6 is evaluated as "○" (satisfactory).

Namely, as indicated by a curve g6 of FIG. 11B, preferred example 6 can keep a high wind velocity substantially uniformly at all the positions (P1 to P7) and thereby increase the suction force substantially uniformly at all the positions (P1 to P7). Because the dust particulates can be drawn uniformly from the entire dust removing space within the hood 15 into the exhaust ducts 20 in this manner, preferred example 6 can remove dust particles efficiently from the workpiece surface 11.

Next, a description will be given about the dust removing capability of the dust removal apparatus 10 of the present invention, with reference to FIG. 12 and TABLE 3.

Figure 12:
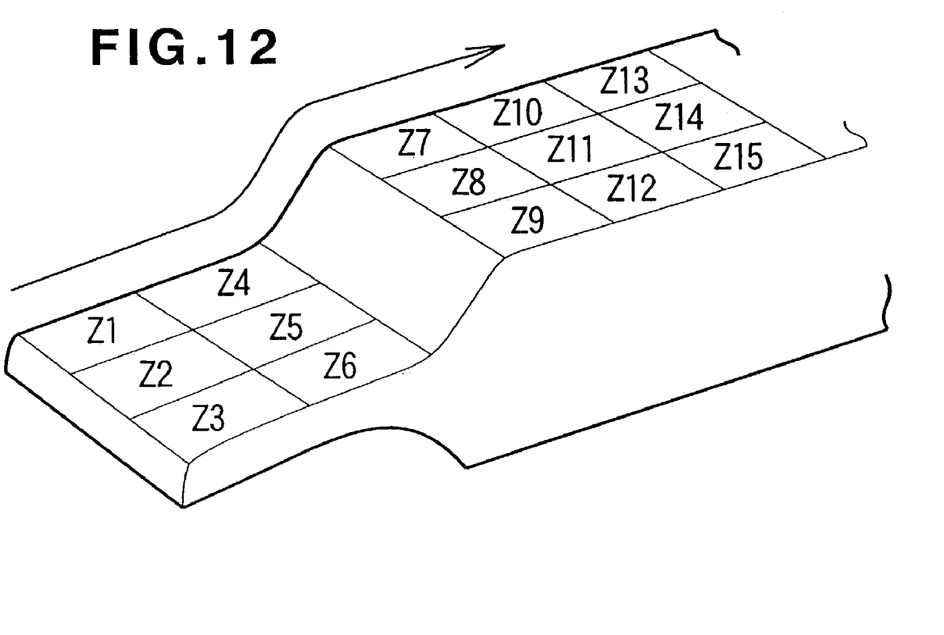
FIG. 12 is a perspective view of a workpiece provided for testing the dust removing capability of the dust removal apparatus of the present invention.

FIG. 12 is a perspective view of a workpiece provided for testing the dust removing capability of the dust removal apparatus 10 of the present invention. The test was conducted under the following testing conditions:

Body of a motor vehicle was used as the workpiece. Prior to initiation of dust removal operations by the apparatus 10, dust particles were put in advance on the workpiece surface 11 that had been previously segmented into a total of fifteen zones Z1 to Z15, and the dust particles present on the individual zones Z1 to Z15 were counted on the zone-by-zone basis. After counting the number of the dust particles on each of the zones Z1 to Z15, the dust removal apparatus 10 was driven or activated under the following conditions:

relative speed between the dust removal apparatus 10 and the workpiece (motor vehicle body) surface: within a speed range of 5.1–5.7 m/min.;

rotations of the rotary brush: 170 rpm;

wind velocity V1 produced by the rotation of the rotary brush: 1.7 m/s; and wind velocity V2 produced by the air jet emission by the rear and front air nozzle units: 5.0 m/s.

After the dust removal operations by the dust removal apparatus 10, the number of the dust particles remaining on each of the zones Z1 to Z15 was counted, and then, for each of the zones Z1 to Z15, the counted value after the dust removal operations was compared to the counted value before the dust removal operations to thereby determine a dust removal rate as indicated in TABLE 3.

TABLE 3

| Zone No. | Before Dust Removal | After Dust Removal |
|---|---|---|
| Z1 | 168 | 4 |
| Z2 | 189 | 1 |
| Z3 | 174 | 5 |
| Z4 | 145 | 4 |
| Z5 | 124 | 1 |
| Z6 | 135 | 1 |
| Z7 | 89 | 2 |
| Z8 | 81 | 2 |
| Z9 | 108 | 3 |
| Z10 | 148 | 2 |
| Z11 | 189 | 1 |
| Z12 | 168 | 1 |
| Z13 | 159 | 1 |
| Z14 | 124 | 1 |
| Z15 | 172 | 1 |
| Total | 2,173 (A) | 30 (B) |
| Dust Removal Rate (A–B)/A | | 98.6% |
| Evaluation | | ○ |

As indicated in TABLE 3 above, the numbers of dust particles present on the individual zones prior to the dust removal by the apparatus were: 168 on the first zone Z1; 189 on the second zone Z2;, 174 on the third zone Z3; 145 on the fourth zone Z4; 124 on the fifth zone Z5; 135 on the sixth zone Z6; 89 on the seventh zone Z7; 81 on the eighth zone Z8; 108 on the ninth zone Z9; 148 on the tenth zone Z10; 189 on the eleventh zone Z11; 168 on the twelfth zone Z12; 159 on the third zone Z13; 124 on the fourth zone Z14; and 172 on the fifteenth zone Z15. Therefore, the total number of the dust particles present on the zones Z1 to Z15 prior to the dust removal was 2,173.

On the other hand, the numbers of dust particles present on the individual zones after the dust removal by the apparatus were: 4 on the first zone Z1; 1 on the second zone Z2;, 5 on the third zone Z3; 4 on the fourth zone Z4; 1 on the fifth zone Z5; 1 on the sixth zone Z6; 2 on the seventh zone Z7; 2 on the eighth zone Z8; 3 on the ninth zone Z9; 2 on the tenth zone Z10; 1 on the eleventh zone Z11; 1 on the twelfth zone Z12; 1 on the thirteenth zone Z13; 1 on the fourteenth zone Z14; and 1 on the fifteenth zone Z15. Therefore, the total number of the dust particles left on the zones Z1 to Z15 after the dust removal was 30.

The results of the test indicates that the total number of the dust particles (2,173 dust particles) measured immediately before the dust removal was reduced dramatically, through execution of the dust removal operations by the apparatus 10, to only 30. Thus, the dust removal rate, {(2,173−30)/2,173}×100, was 98.6%, from which it can be seen that most of the dust particles can be removed from the zones Z1 to Z15. Because experiences have ascertained that no painting defects would occur if the dust removal rate is 90% or over, the dust removing capability of the apparatus 10, which could increase the dust removal rate up to 98.6%, is well worthy of the "○" evaluation.

The following paragraphs describe advantages of the front and rear air nozzle units 25 and 30 employed in the dust removal apparatus 10, on the basis of TABLE 4. In TABLE 4, comparing example 4 is a dust removal apparatus having no front or rear air nozzle unit associated with a rotary brush, comparing example 5 is a dust removal apparatus having only a front air nozzle unit associated with a rotary brush, and preferred example 7 is the above-described dust removal apparatus 10 having the front and rear air nozzle units associated with the rotary brush 12.

Dust removal tests were conducted for individual ones of such comparing example 4, comparing example 5 and preferred example 7. Each of the dust removal tests was carried out in generally the same manner as having been described above in relation to TABLE 3; namely, a body surface of a motor vehicle was segmented into a plurality of zones, the number of dust particles before the dust removal operations and the number of dust particles after the dust removal operations were counted for each of the zones, and then a dust removal rate was determined from the total number A of dust particles before the dust removal operations and the total number B of dust particles after the dust removal operations {(A-B)/A}.

Results of the tests are indicated in TABLE 4 below. Because of the empirical confirmation that no painting defects would occur if the dust removal rate is 90% or over, a threshold value of the dust removal rate was set to 90% so that a dust removal rate equal to or higher than 90% was evaluated as "○" while a dust removal rate lower than 90% was evaluated as "X".

TABLE 4

| | Air Nozzle Unit | Dust Removal Rate | Evaluation |
|---|---|---|---|
| Comparing Example 4 | No Front or Rear Air Nozzle Unit Provided | 50.2% | X |
| Comparing Example 5 | Only Front Air Nozzle Unit Provided | 80% | X |
| Preferred Example 7 | Front & Rear Air Nozzle Units Provided | 98.6% | ○ |

As indicated in TABLE 4, comparing example 4 presented 50.2% dust removal rate that is much below the threshold value 90% and thus evaluated as "X".

Comparing example 5 presented an 80% dust removal rate that is below the threshold value 90% and thus evaluated as "X".

Preferred example 7 presented a 98.6% dust removal rate that is higher the threshold value 90% and thus evaluated as "○". Namely, because of the provision of the front and rear air nozzles 25 and 30, preferred example 7 can significantly enhance the dust removal rate.

Whereas the embodiment of the present invention has been described above in relation to the case where the workpiece surface 11 is a body surface of a motor vehicle, the present invention is not so limited and may be applied to other workpiece surfaces. Further, although the embodiment of the present invention has been described above in relation to the case where the dust removal apparatus 10 is moved relative to the workpiece surface 11 in a forward direction with the front end 15a of the hood 15 preceding the read end 15b, the dust removal apparatus 10 may alternatively be moved relative to the workpiece surface 11 in a rearward direction with the rear end 15b of the hood 15 preceding the front end 15a.

The present invention arranged in the above-described manner can afford various benefits.

Particularly, the present invention is characterized by the provision of the rear air nozzle unit secured to a rear end portion of the hood and the front air nozzle unit secured to a front end portion of the hood. The front air nozzle unit can form an air curtain in front of the rotary brush by emitting air jets onto the workpiece surface. The thus-formed air curtain can effectively prevent dust particles from undesirably scattering forward to the outside of the rotary brush, and therefore, there is no need to provide an extra rotary brush right in front of the hood as in the conventional dust removal apparatus. In addition, by the front air nozzle unit emitting air jets onto a region of the workpiece surface near the rotary brush along the linear front end edge of the hood, it is possible to cause dust particles, adhering to the workpiece surface, to get detached from or more or less floated off the workpiece surface, so that the dust particles can be wiped away by the rotating rotary brush with a significantly increased efficiency. As a result, the present invention can efficiently remove dust particles from the workpiece surface.

The present disclosure relates to the subject matter of Japanese Patent Application No. 2002-012195, filed Jan. 21, 2002, the disclosure of which is expressly incorporated herein by reference in its entirety.

What is claimed is:

1. A dust removal apparatus comprising:
    a rotary brush adapted to be disposed substantially parallel to a workpiece surface from which dust particles are to be removed, rotation of said rotary brush producing a first wind velocity that moves along said workpiece surface in the direction of rotation of said rotary brush;
    a hood of a generally semi-cylindrical shape covering an upper half portion of said rotary brush, said hood having linear front and rear end edges, and a pair of opposed side surfaces each having a substantially semi-circular shape;
    at least one exhaust duct connected to said hood, said rotary brush being moveable, along with said hood, relative to the workpiece surface to thereby remove dust particles from the workpiece surface in such a manner that the removed dust particles are directed to said exhaust duct;
    a front air nozzle unit disposed outside said hood and located along the front end edge of said hood for emitting air jets downward at an angle toward said rotary brush and onto a region of the workpiece surface near said rotary brush and substantially along the linear front end edge of said hood such that an air curtain is formed in front of said rotary brush; and
    a rear air nozzle unit disposed outside said hood and located along the rear end edge of said hood for emitting air jets downward at an angle toward said rotary brush and onto another region of the workpiece surface near said rotary brush and substantially along the linear rear end edge of said hood said air jets producing a second wind velocity that causes another air curtain to be formed in back of said rotary brush;
    wherein the vector sum of said first wind velocity and said second wind velocity produces a third wind velocity that is directed substantially vertically downward, thereby enhancing the ability of said dust removal apparatus to trap and collect dust particles.

2. The dust removal apparatus as claimed in claim 1 wherein said at least one exhaust duct is connected to said hood via a tapering connection member that defines an exhaust passage having a larger sectional area at one end thereof adjacent to said hood and having a smaller sectional area at another end thereof adjacent to said at least one exhaust duct.

3. The dust removal apparatus as claimed in claim 1 wherein said first wind velocity is 1.7 meters per second and said air jets emitted by said rear air nozzle unit are directed toward said rotary brush at an angle of between about 20–25° relative to vertical.

4. The dust removal apparatus as claimed in claim 3 wherein said second wind velocity is 5.0 meters per second when said air jets are directed toward the rotary brush at an angle of 20° relative to vertical and said second wind velocity is 4.2 meters per second when said air jets are directed toward the rotary brush at an angle of 25° relative to vertical.

5. The dust removal apparatus as claimed in claim 2, wherein said at least one exhaust duct includes a plurality of exhaust ducts arranged along a longitudinal axis of the rotary brush, said plurality of exhaust ducts being connected to the hood via a plurality of said tapering connection members so that a suction force created within the hood to draw the dust particles into the respective exhaust ducts is substantially constant along the length of the hood.

6. The dust removal apparatus as claimed in claim 1 wherein said first wind velocity is 1.7 meters per second.

7. The dust removal apparatus as claimed in claim 1 wherein said second wind velocity is between 4.2–5.0 meters per second.

8. The dust removal apparatus as claimed in claim 1 wherein said air jets emitted by said rear air nozzle unit are directed toward said rotary brush at an angle of between 20–25° relative to vertical.

9. The dust removal apparatus as claimed in claim 1 wherein said second wind velocity is between 4.2–5.0 meters per second as the angle at which said air jets are emitted by said rear air nozzle unit varies between 20–25° relative to vertical.

* * * * *